Nov. 28, 1950 — H. T. MAAGER — 2,531,635
HUNTING ARROW AND ARROWHEAD
Filed Aug. 6, 1948
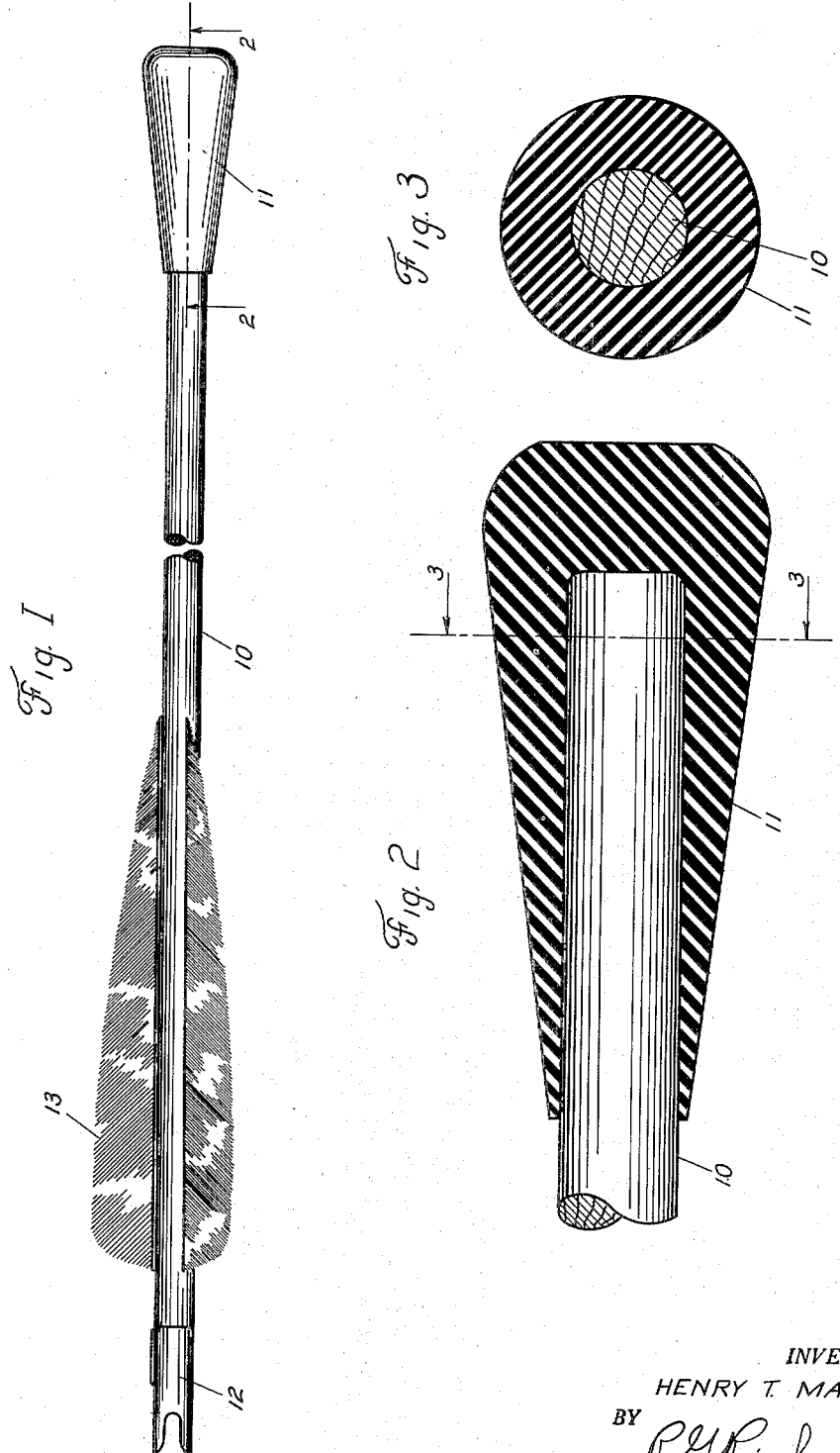
INVENTOR.
HENRY T. MAAGER
BY R. G. Richardson
ATT'Y.

Patented Nov. 28, 1950

2,531,635

UNITED STATES PATENT OFFICE 2,531,635

HUNTING ARROW AND ARROWHEAD

Henry T. Maager, Delavan, Wis.

Application August 6, 1948, Serial No. 42,922

4 Claims. (Cl. 273—106.5)

The present invention relates in general to arrows, but more in particular to hunting arrows for killing small game such as rabbits and squirrels, and the object of the invention is a new and improved arrow of this character.

The arrow known as a field arrow, having a pointed head, has been used for hunting small game, but the arrow most commonly used for this purpose is known as a "blunt" and has a head comprising a flat or blunt ended cylindrical metal cap fitted on the end of the shaft. Such arrows have the objection that they penetrate too readily and do not kill immediately unless the game is struck in a vital spot.

A blunt head arrow may be shot clear through a rabbit, for example, but the animal may be able to run for some distance and get away, even though the wound inflicted is severe enough to eventually cause its death. Such results are highly unsatisfactory, not so much because of the loss of the game, but because of the suffering produced by the use of so ineffective a weapon. The infliction of wounds which cripple or mutilate is repugnant to all and has mitigated against the popularity of the bow and arrow for hunting small game.

A special object of the invention therefore is a hunting arrow which has greater instantaneous killing power for small game than arrows known heretofore, and which is vastly more humane because it substantially eliminates all danger of seriously wounding an animal without effecting its capture.

This object is accomplished, surprisingly enough, by an arrowhead composed of resilient material such as soft rubber. Due partly to the material used and partly to the design of the head, the arrow cannot penetrate the animal, wasting the energy in the shaft, but transmits the major part of such energy to the body of the animal. The arrow has extraordinary shocking power, therefore, and kills, or at least stuns, any small animal which is reasonably well hit. All good hits are successful in stopping the game, therefore, while in the case of such a poor hit that the animal is not stunned and gets away it is not mutilated and has a good chance for recovery.

The invention will be described more fully in the following specification reference being had to the accompanying drawing, in which—

Fig. 1 shows a hunting arrow constructed in accordance with the invention;

Fig. 2 is an enlarged cross-section through the arrowhead on the line 2—2, Fig. 1; and Fig. 3 is a cross-section on the line 3—3, Fig. 2.

Referring to the drawing, the arrow therein shown comprises a shaft 10, a head 11, nock 12, and feathers or fletching indicated at 13. Except for the head these parts are all of known construction and will require no detailed description.

The head 11 is molded from a suitable rubber compound, of which a large number are known and in use. The manufacturers do not generally divulge the exact formulas for the compounds they use, but the best compounds such as I prefer contain a high grade of natural rubber, a suitable filler, and a vulcanizing agent, together with small quantities of other ingredients known in the rubber manufacturing art. Synthetic rubber of the proper resiliency can be used. The molding process may be similar to processes generally employed in the manufacture of small rubber articles and hence need not be described in detail. With a multi-cavity mold, the heads can be made in large quantities and at a low cost.

The materials in the rubber compound should be so proportioned that the molded heads have a hardness of about 60 to 70 when tested by a Durometer in accordance with the method prescribed by the American Society for Testing Materials for testing the hardness of rubber articles. Stating it another way, they are about as hard as a soft rubber eraser, or may be slightly harder. They are highly resilient.

The shape of the head is shown clearly in the several views of the drawing. It has a rather blunt, but rounded forward striking portion and a tapered rearwardly extending portion having an axial bore for receiving the associated shaft. The arrow is shown full size in Fig. 1. The head is approximately 1¾ inches long and ¾ inch in diameter at the point where it has the largest diameter. A standard size shaft is shown, having a diameter of $\frac{5}{16}$ inch.

The diameter of the bore in the head is $5/16$ inch, to fit the $5/16$ inch shaft. The head may, however, be used on $11/32$ inch and $3/8$ inch shafts, since the resilient material of which it is composed can be stretched enough to take these larger shafts.

In order to assemble the head on the shaft the end of the shaft is dipped in a soap solution and is then pressed into the head as far as it will go; that is, until the flat end of the shaft engages the bottom of the bore in the head. During this operation the air in the bore escapes along the side of the shaft. The head is retained on the shaft by friction and by atmospheric pressure. The surface of the shaft is quite smooth so that the bore in the head is effectively sealed against the entrance of air, making it difficult and nearly impossible to pull the head off after it has been assembled on the shaft. It can be done, however, after insertion of a thin instrument to break the seal.

The dimensions given for the head and the shape shown in the drawing need not be rigidly adhered to, but have been followed in practice and have been found to be very satisfactory. The head should have a relatively massive striking portion forward of the shaft and should be tapered to approximately the diameter of the shaft, providing a streamlined contour which minimizes wind resistance. The forward end of the head is necessarily somewhat rounded in view of the foregoing, but should not be too much so, that is, there should be a considerable generally flattened area at the forward end, believed to be important for preventing penetration and obtaining great striking power. The bottom of the bore should be substantially flat corresponding to the shape of the end of the shaft, whereby the energy of the shaft may be efficiently transmitted to the striking portion of the head. The long tapered portion of the head which grips the shaft contributes to this result, and insures against the shaft being driven into or through the head upon impact.

My improved hunting arrow may be employed in the pursuit of any small game and for the killing of pests such as gophers and woodchucks. When a small animal is hit fairly with the arrow it is generally killed instantly, or stunned, in which case it may be dispatched by other means without suffering or danger of escape. It is difficult to account for the great and unexpected shocking power which is exhibited. I believe, however, that it is due to the absence of any penetration and to the design of the head and to the resilient material of which it is composed, whereby the energy in the driven shaft is efficiently transmitted to the body of the animal.

The principal advantage which my improved hunting arrow has over previously known arrows is its greatly increased killing power for small game and the more humane character of its use which results therefrom, as already explained. There are other advantages, including reduction of arrow breakage from striking solid objects, as frequently happens when hunting in rocky terrain, and prevention of arrow losses due to sticking high up in the trunks or limbs of trees when hunting squirrels, crows, and similar game.

The invention having been described, that which is believed to be new and for which the protection of Letters Patent is desired, will be pointed out in the appended claims.

I claim:

1. An arrow head molded of a resilient rubber compound and adapted to be assembled on a shaft to make a hunting arrow, said head having a solid forward striking portion with a blunt but rounded end and a body portion having a cylindrical bore of uniform diameter therein for reception of said shaft, said body portion being rearwardly and substantially uniformly tapered to an end diameter which approximates the diameter of the shaft when the head is assembled thereon, the said arrow head as a whole having a streamlined contour, and the length of the body portion which surrounds the shaft being at least three times the length of the forward striking portion.

2. An arrow head molded of a resilient rubber compound and adapted to be assembled on a shaft to make a hunting arrow, said head having a solid forward striking portion with a blunt but rounded end and a rearwardly continuously tapered body portion having a cylindrical bore of uniform diameter therein for reception of said shaft, the said arrow head having a streamlined contour to decrease wind resistance, the said body portion having its smallest diameter at the end and only slightly larger than that of the shaft so that the contour of the head substantially merges into the contour of the shaft when the head is assembled thereon, the length of the striking portion forward of the shaft being not more than one and one-half times the diameter of the shaft, and penetration of the striking portion by the shaft upon striking a solid object being prevented by a flat bottom in said bore engaging and matching the flat end of said shaft and frictional engagement between the shaft and the wall of said bore, the length of the bore being at least three times the diameter of the shaft.

3. A hunting arrow comprising a shaft and a head composed throughout of resilient rubber, said head having a hollow body portion of uniform internal diameter surrounding said shaft and a solid relatively massive striking portion forward of the shaft, the said body portion having an external diameter at the rear slightly greater than that of the shaft and uniformly increasing to more than twice the diameter of the shaft at a point forward of the shaft where the body becomes part of said striking portion, said shaft having a flat end in contact with the material of said striking portion, and the length of the said body portion surrounding the shaft being at least three times the length of the said striking portion.

4. A hunting arrow having a great killing power for small game, said arrow comprising a shaft and a head adapted to efficiently transmit the energy of the shaft, when shot from a bow, to the body of an animal, without penetration of the animal, the head being made of rubber and having the general form of a slender truncated cone with a rounded formation at the base and a relatively flat area constituting the striking end of the head, the said head having a solid portion of substantial thickness between its striking end and the end of the shaft and a hollow portion of uniform internal diameter extending back along the shaft for a distance which is more than twice the thickness of said solid portion, and said hollow portion being substantially uniformly rearwardly tapered to the end thereof where its external diameter is only slightly greater than the diameter of said shaft.

HENRY T. MAAGER.

REFERENCES CITED

The following references are of record in the file of this patent:

UNITED STATES PATENTS

| Number | Name | Date |
|---|---|---|
| 295,304 | Swan | Mar. 18, 1884 |
| 879,471 | Kabureck | Feb. 18, 1908 |
| 1,423,551 | Adriance | July 25, 1922 |
| 1,554,653 | Poole | Sept. 25, 1925 |
| 2,377,498 | Jacke | June 5, 1945 |